UNITED STATES PATENT OFFICE.

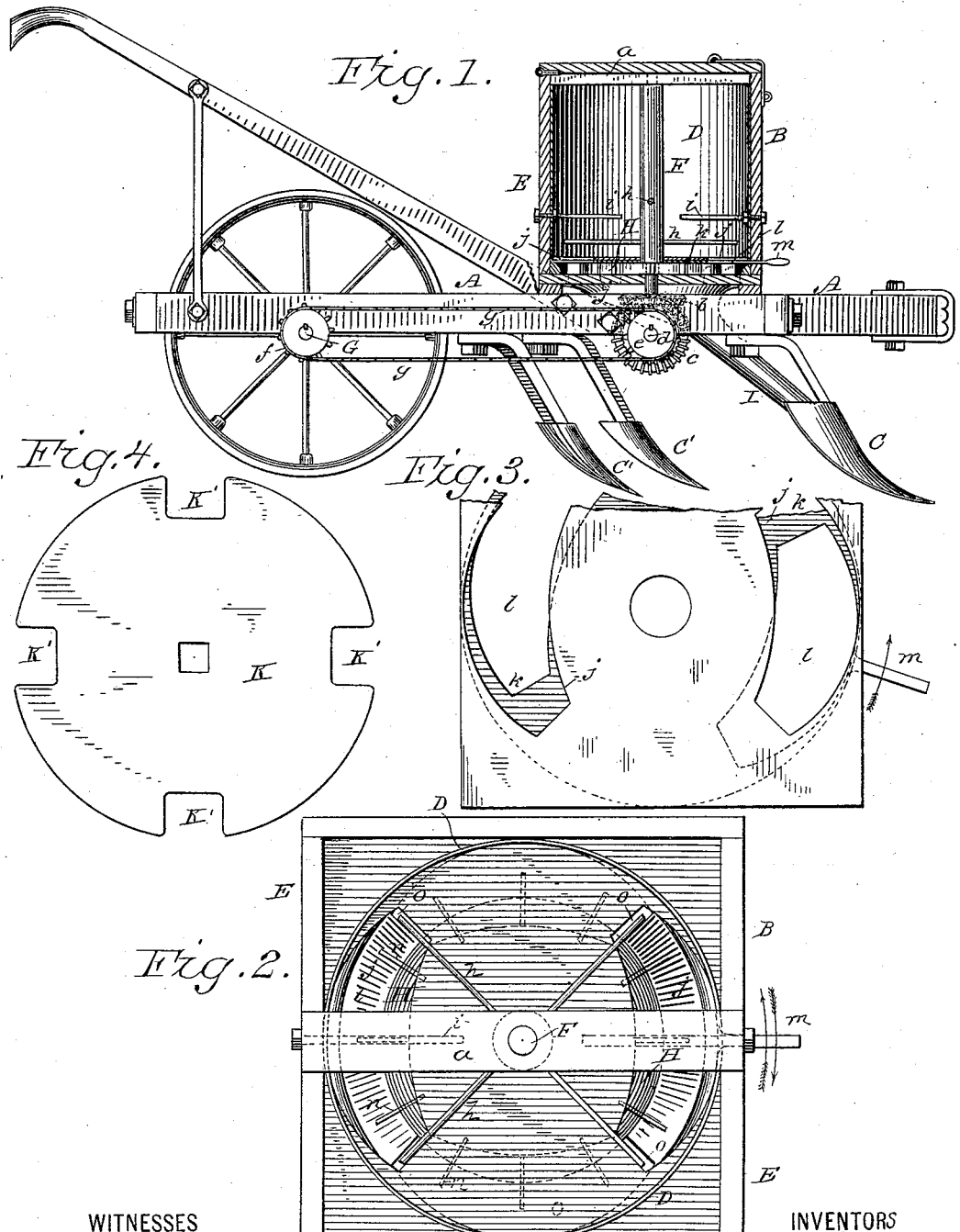

MARTIN SHANK AND FRANCIS G. GREEN, OF CHRISMAN, ILLINOIS.

SEED-PLANTER.

SPECIFICATION forming part of Letters Patent No. 349,527, dated September 21, 1886.

Application filed March 6, 1886. Serial No. 194,261. (No model.)

*To all whom it may concern:*

Be it known that we, MARTIN SHANK and FRANCIS G. GREEN, of Chrisman, Edgar county, Illinois, have invented certain new and useful Improvements in Seed-Planters, of which the following is a specification.

Our invention relates particularly to mechanism for dropping the seed from the hopper into the furrow made by the plow.

In the accompanying drawings, Figure 1 is an elevation, partly in section, of our improved planter; Fig. 2, a top view of the interior of the hopper; Fig. 3, a detail view of the slides for regulating the discharge of seed, and Fig. 4 a plan view of a notched wheel or disk for feeding corn from the hopper.

As shown in Figs. 1, 2, and 3, the invention is illustrated as applied to a cotton-seed planter.

The main frame A may be of any construction suitable to support the hopper B and the plows or shovels C C'. The hopper B is mounted on the main frame just over the plows C. It consists of a cylinder, D, inclosed in a box, E. Through the cylinder extends a shaft, F, journaled in a cross-piece, *a*, on the top of the box, and extending through the bottom of the cylinder and box. On the lower end of the shaft F is a crown-wheel, *b*, that gears with a cog, *c*, mounted on a horizontal shaft, *d*, journaled in the main frame. On the shaft *d* is a pulley, *e*, that gears with a pulley, *f*, on the axle G by means of a chain or belt, *g*. The shaft F carries two or more stirrers, *h*, and two or more spikes, *i*, project inwardly from the side of the cylinder. The bottom of the cylinder is provided with two curved slotted openings, *j*, on opposite sides of the shaft F. Beneath the bottom of the cylinder is a disk, *k*, having openings *l*, corresponding with the openings *j*. The disk *k* is provided with a handle, *m*, that extends through a horizontal slot in the side of the hopper, by which the disk may be turned to have the openings *l* register with the openings *j*, or to close the openings or to vary the size of the discharge-openings.

On the shaft F, between the disk *k* and the bottom of the box, is a wheel, H, carrying a series of radial blades, *n*, for feeding the seed that passes through the openings *j* and *l* to the discharge-openings *o* in the bottom of the box E. The openings *o* are similar in shape to the openings *j* and *l*, and are of about the same size. They do not, however, lie directly under the openings *j* and *l*, but under the closed bottom of the cylinder. As shown in the drawings, the opposite ends of the slots *o* meet the opposite ends of the slots *j*. Beneath the bottom of the box E is a chute, I, that incloses the openings in the bottom of the box and extends to the rear of the front shovel, C. As the machine advances, the shaft F, carrying the stirrers *h* and the feed-wheel H, is revolved, and the seed is fed through the openings *j* and *o* evenly and regularly, and through the chute I to the furrow behind the shovel C. The shovels C' C' turn the soil back into the furrow, thus covering up the seed.

By substituting the disk *k*, Fig. 4, for the wheel H, the machine may be used for planting corn. The disk *k* is about equal in size to the wheel H; but instead of having a series of blades in its periphery, it is provided with four notches, *k'*.

We claim as our invention—

1. The combination, substantially as set forth, of the hopper, the horizontal feed-wheel having blades on its edge or periphery, the openings in the hopper just over the edge of the feed-wheel, and the discharge-openings below the feed-wheel between the openings in the hopper.

2. The combination, substantially as set forth, of the hopper, the curved slotted openings in the bottom of the hopper, the slotted disk for regulating the size of the openings, the feed-wheel having blades on its periphery, and the slotted openings in the bottom plate under the feed-wheel.

3. The combination, substantially as set forth, of the hopper, the vertical shaft that extends through the hopper, the stirrers carried on the shaft, the openings in the bottom of the hopper, the horizontal feed-wheel below said openings, the openings below the feed-wheel between the openings in the hopper, and the chute that conveys the seed to the furrow.

In testimony whereof we have hereunto subscribed our names.

MARTIN SHANK.
FRANCIS G. GREEN.

Witnesses:
W. T. GILKEY,
ALFRED MANNING.